United States Patent
Kanas et al.

(10) Patent No.: US 11,143,936 B2
(45) Date of Patent: Oct. 12, 2021

(54) SWIVEL COVERS

(71) Applicant: HEWLETT-PACKARD DEVELOPMENT COMPANY, L.P., Houston, TX (US)

(72) Inventors: Derek Kanas, Houston, TX (US); Chan-Woo Park, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 637 days.

(21) Appl. No.: 16/077,188

(22) PCT Filed: Jul. 26, 2017

(86) PCT No.: PCT/US2017/043842
§ 371 (c)(1),
(2) Date: Aug. 10, 2018

(87) PCT Pub. No.: WO2019/022727
PCT Pub. Date: Jan. 31, 2019

(65) Prior Publication Data
US 2021/0208478 A1    Jul. 8, 2021

(51) Int. Cl.
*G03B 11/04*   (2021.01)
*G06F 1/16*    (2006.01)

(52) U.S. Cl.
CPC .......... *G03B 11/043* (2013.01); *G03B 11/041* (2013.01); *G06F 1/1686* (2013.01); *G06F 1/1605* (2013.01)

(58) Field of Classification Search
CPC ... G06F 1/1686; G03B 11/041; G03B 11/043; G03B 17/02
See application file for complete search history.

(56) References Cited

U.S. PATENT DOCUMENTS

| | | | |
|---|---|---|---|
| 5,117,249 A | 5/1992 | Spector | |
| 7,520,687 B2* | 4/2009 | Tsai | G03B 17/00 396/448 |
| 7,568,848 B2* | 8/2009 | Ho | G03B 17/02 359/507 |
| D669,112 S | 10/2012 | Gustaveson | |

(Continued)

FOREIGN PATENT DOCUMENTS

| CN | 204496352 U | 7/2015 |
| DE | 202011106305 U1 | 1/2012 |
| RU | 133331 U1 | 10/2013 |

OTHER PUBLICATIONS

"Nope—Simple and Elegant Magnetic Privacy Shield For Imacs, Macbooks, Laptops, and Desktops", Erli Bird, Retrieved from internet—https://erlibird.com/go/nope, 2017, 6 Pages.

*Primary Examiner* — Nidhi Thaker
(74) *Attorney, Agent, or Firm* — HPI Patent Department

(57) ABSTRACT

Examples disclosed herein provide a cover for obscuring an opening found on a housing of a computing device. As an example, the housing includes a bezel that includes the opening extending through the bezel. The cover includes a pin disposed on a first end of the cover, wherein the pin is insertable into a hole along the bezel. The housing includes features to swivel a second end of the cover opposite the first end in either a first or second position. In the first position, the second end is to obscure a viewing portion of the opening, and in the second position, the second end is to expose the viewing portion.

10 Claims, 4 Drawing Sheets

(56) References Cited

U.S. PATENT DOCUMENTS

| | | | |
|---|---|---|---|
| 8,531,832 B2 | 9/2013 | Wu et al. | |
| 9,465,276 B2 | 10/2016 | Jonsson et al. | |
| 9,535,310 B2 | 1/2017 | Gonzalez et al. | |
| 10,317,776 B2* | 6/2019 | Gustaveson, II | G03B 11/04 |
| 2007/0253705 A1* | 11/2007 | Ho | G03B 17/02 |
| | | | 396/448 |
| 2013/0235462 A1* | 9/2013 | Haas | G03B 11/043 |
| | | | 359/614 |
| 2014/0016031 A1* | 1/2014 | Tsai | G06F 1/1686 |
| | | | 348/376 |
| 2014/0198439 A1* | 7/2014 | Pietro | G06F 1/16 |
| | | | 361/679.02 |
| 2015/0059251 A1* | 3/2015 | Rinner | H04M 1/0283 |
| | | | 49/465 |
| 2016/0105598 A1* | 4/2016 | Zeira | H04N 5/2252 |
| | | | 348/143 |
| 2016/0161830 A1 | 6/2016 | Gonzalez et al. | |
| 2017/0329206 A1* | 11/2017 | Gustaveson, II | H04N 5/2257 |
| 2018/0123631 A1* | 5/2018 | Hessabi | H04B 1/3888 |
| 2019/0204526 A1* | 7/2019 | Deng | G06F 1/1605 |
| 2020/0073073 A1* | 3/2020 | Lai | G03B 11/043 |
| 2020/0196142 A1* | 6/2020 | Yang | G06F 21/83 |
| 2020/0371406 A1* | 11/2020 | Hung | H04N 5/2254 |

* cited by examiner

SWIVEL COVERS

BACKGROUND

Computing devices, such as laptop computers, desktop computers, and smartphones, may include a camera (e.g., webcam). The camera may capture electronic images such as photos and/or video images. The camera may capture the electronic images responsive to an input such as an input provided by a user and/or an application, among other possibilities. The cameras may be located on an external surface of the computing device, in order to promote capture of the electronic images. In addition to the camera, the external surface of the computing devices may include a microphone for capturing audio.

DETAILED DESCRIPTION

Privacy is a concern for users of such computing devices including cameras and/or microphones. For instance, control may be gained of a camera or microphone in a computing device for a variety of undesired reasons. For instance, control may be acquired of the camera included in the computing device and/or access may be gained to electronic images captured by the camera, unbeknownst to a user of the computing device. In some approaches, this may be possible because the camera may be visible and accessible to the user at all times during operation of the computing device. For example, in some approaches the camera (or microphone) may be mounted on an exterior portion of the computing device (e.g., on a display of the computing device), where it may be visible and accessible to the user during operation of the computing device.

Examples disclosed herein provide a cover for obscuring an opening found on the computing device, such as for a lens of the camera or the microphone, according to an example. By having the ability to physically obscure the opening via the cover, rather than via software or electronically, the user of the computing has physical assurance that the opening, such as for the camera lens or microphone, is covered, addressing the privacy concerns described above. For example, even if the webcam or microphone is hacked, where images or audio can be captured without knowledge of the user, using the cover to physically obscure or shutter the opening where the webcam or microphone is located prevents such capture from occurring. As will be further described, a first end of the cover may be fixed to the computing device, and a second end of the cover opposite the first end may be swiveled in either a first position that obscures the viewing portion of the opening, or a second position that exposes the viewing portion.

Figure 1:
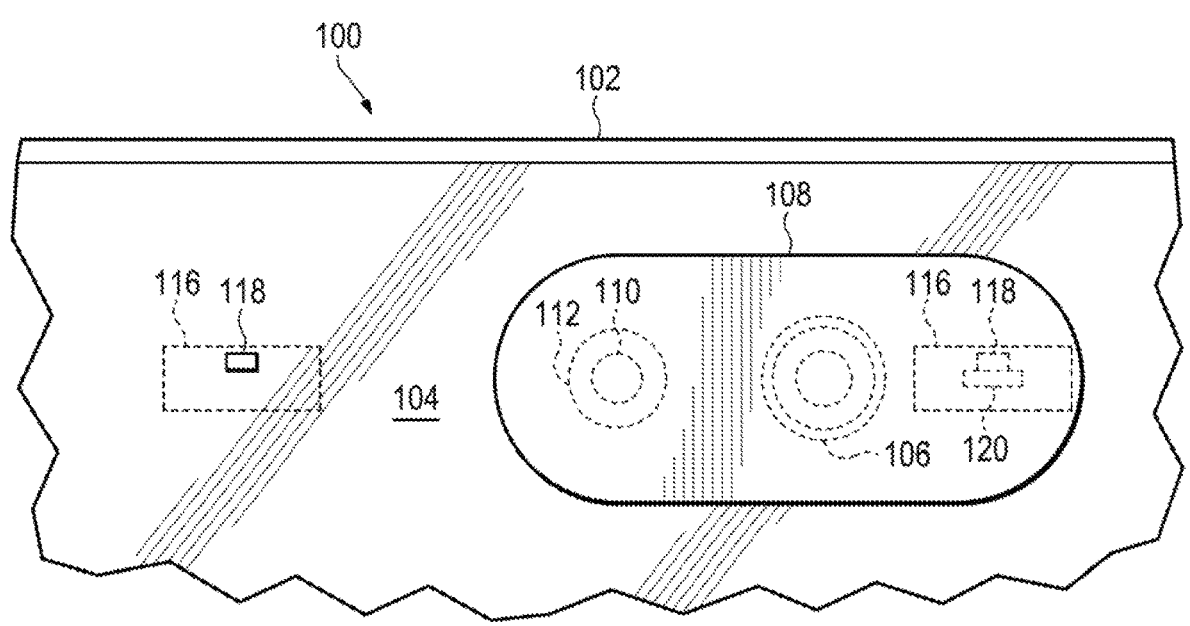
FIG. 1 illustrates a computing device including a housing with a cover that swivels to provide privacy measures to users of the computing device, according to an example.

With reference to the figures, FIG. 1 illustrates a computing device 100 including a housing 102 with a cover 108 that swivels to provide privacy measures to users of the computing device 100, according to an example. As an example of the privacy measures provided by the cover 108, the cover 108 may be swiveled to obscure the lens of a camera or a microphone of the computing device 100. Referring to FIG. 1, the lens or microphone may be exposed through an opening 106 extending, for example, through a bezel 104 of the housing 102. When the user desires to use the camera or microphone, the user may then flick or push the cover 108, in order to swivel the cover 108 to a position that exposes the opening 106, as will be further described.

In order to switch the cover 108 between a first position that obscures a viewing portion of the opening 106 and a second position that exposes the viewing portion of the opening 106, the housing 102 may include features to assist in swiveling the cover 108 between the two positions. Referring to FIG. 1, the features include magnets 116 for swiveling the cover 108 between the first and second positions, as will be further described. In addition to the magnets 116, or in place of the magnets 116, other features may be used (e.g., spring feature 404 in FIGS. 4A-C). Rather than relying on software or electronics to ensure privacy measures, which can be hacked, the user can rely on the physical protection provided by the cover 108 to ensure privacy from prying ears or eyes.

Figure 2:
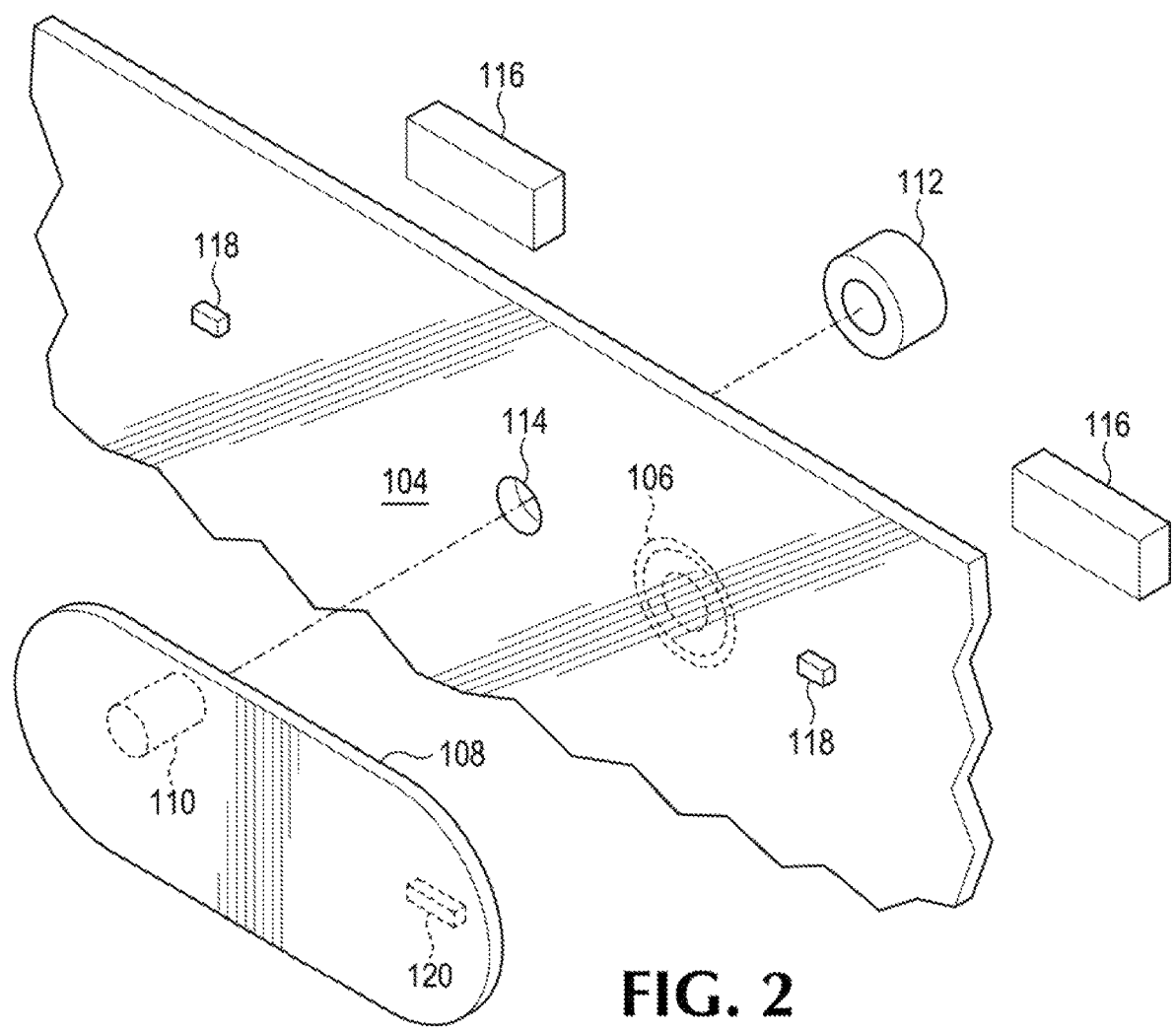
FIG. 2 illustrates an exploded view of the placement of the cover to a bezel, according to an example.

FIG. 2 illustrates an exploded view of the placement of the cover 108 to the bezel 104, according to an example. In order to reduce or prevent any z thickness impact, the cover 108 may be made from a thin sheet metal, as an example. For example, the cover 108 may be a 0.1-0.45 mm thin ferromagnetic metal, such as steel, with varying finishes. For example, if the cover 108 is rubber coated, the cover 108 may not scratch the bezel 104 while swiveling. The cover 108 includes a pin 110 disposed, for example, on a first end of the cover 108. Positioning of the pin 110 with respect to the cover 108 may vary, as long as the cover 108 is allowed to swivel around the pin 110, between the first and second positions. As an example, the pin 110 may be attached to the cover 108 by glue, weld, or another method. The pin 110 is insertable into a hole 114 along the bezel 104. In an internal volume of the housing 102, for example, behind the bezel 104, a locking feature 112 may be included for securing the pin 110, in order to prevent the cover 108 from falling off from the housing 102 of the computing device 100. As an example, the pin 110 may be 3 mm in length and 2 mm in diameter, and the hole 114 drilled in bezel 104 of the computing device 100 may be about 2.1 mm in diameter to fit the pin 110.

As an example, in order to prevent the cover 108 from moving beyond the first position that obscures the viewing portion of the opening 106, or the second position that exposes the viewing portion, the housing 102 may include tabs 118 on the bezel 104 that interacts with another tab 120 on the cover 108. Interaction between the tab 120 and one of the tabs 118 prevents the cover from swiveling past the tab 118, as will be further described. Placement of tabs 118, 120 may vary. For example, tabs 118, 120 may be located in the internal volume of the housing 102 instead, behind the bezel 104, where the tabs 118, 120 may be incorporated with the pin 110, to prevent the cover 108 from swiveling past the first or second positions. As an example of the features assisting the cover 108 to swivel between the two positions, first and second magnets 116 may be found in the internal volume of the housing 102, behind the bezel 104. One of the magnets 116 may be positioned on a first side of the opening 106, and the other magnet 116 may be positioned on a second side of the opening 106 that is opposite the first side of the opening 106. Placing the magnets 116 on either end of opening 106 allows for the cover 108 to swivel between the first and second positions, as will be further described.

Figure 3A:
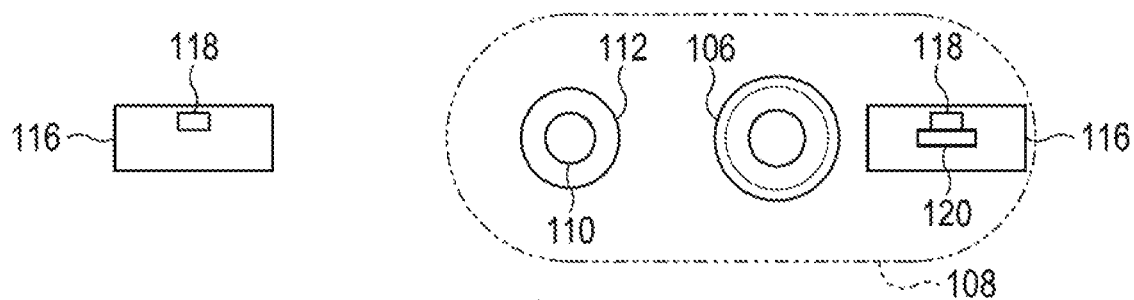
FIGS. 3A-C illustrate the use of magnets to assist the cover in swiveling between a first position and a second position, according to an example.
Figure 3B:
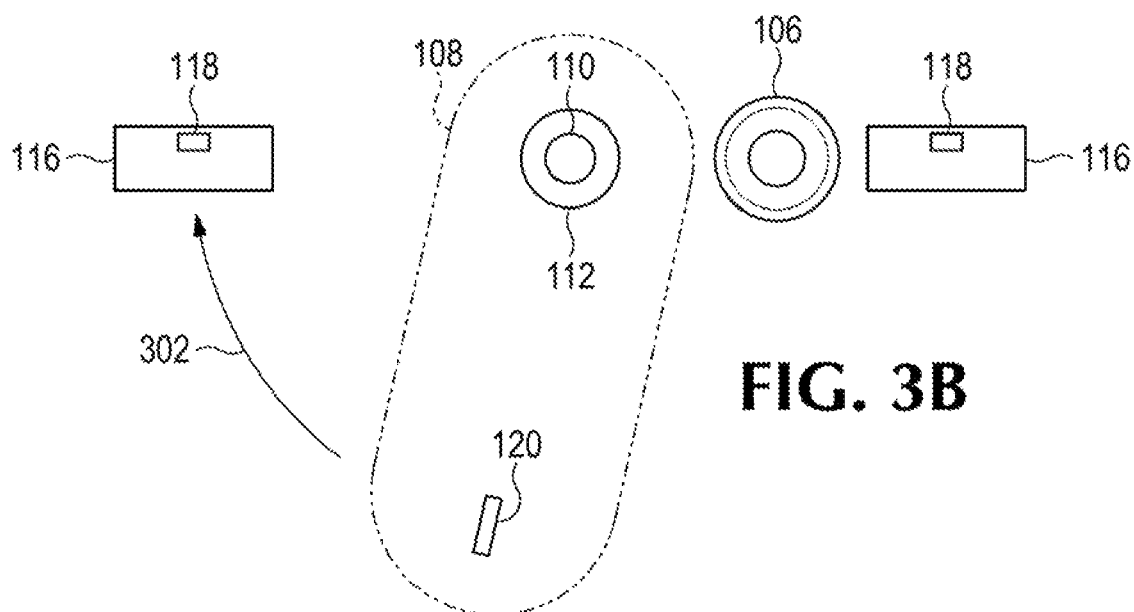
Figure 3C:
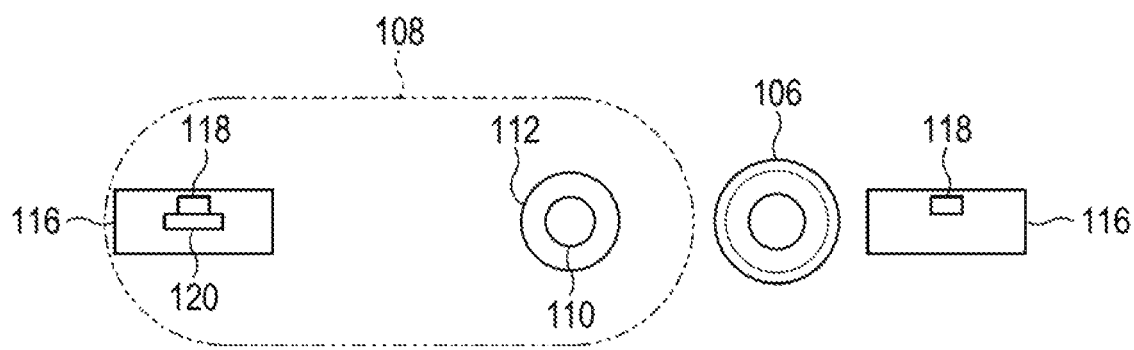

FIGS. 3A-C illustrate the use of magnets 116 to assist the cover 108 in swiveling between a first position that obscures a viewing portion of the opening 106 and a second position that exposes the viewing portion of the opening 106, according to an example. The cover 108 may be a ferromagnetic metal to interact with the magnets 116 for switching between the first and second positions illustrated in FIGS. 3A and 3C, respectively. As will be further described, in addition to the force applied to the cover 108 by a user, the magnitude of the magnetic attraction from each magnet 116 toward the second end of the cover 108 determines whether the cover 108 swivels to the first position illustrated in FIG. 3A or the second position illustrated in FIG. 3C.

Referring to FIG. 3A, the cover 108 is in the first position that obscures the viewing portion of the opening 106. As a result, the lens of the camera and/or microphone exposed through the opening 106 is covered, ensuring privacy. The cover 108 remains magnetically coupled to magnet 116 positioned to the right of opening 106. In addition, upon feature 120 making contact with feature 118 positioned to the right of opening 106, cover 108 may not move beyond the position illustrated in FIG. 3A.

As an example, when the user desires to use the camera or microphone, the user may then flick or push the cover 108 with a force that overcomes the magnetic attraction between the cover 108 and magnet 116 positioned to the right of the opening 106. The force required for overcoming the magnetic attraction may be based on the field strength of the magnet 116, which may be controlled. As an example, upon overcoming the magnetic attraction, when the second end of the cover 108 (i.e., opposite the first end where the pin 110 is located) is pushed away from the first position illustrated in FIG. 3A, the second magnet 116 positioned to the left of the opening 106 may cause the second end of the cover 108 to swivel to the second position illustrated in FIG. 3C. However, the magnetic attraction of the second magnet 116 positioned to the left of the opening 106 is to overcome the magnetic attraction of the other magnet 116 toward the second end of the cover 108, in order for the cover 108 to swivel to the second position.

Referring to FIG. 3B, once the cover 108 is pushed at least 90 degrees past the first position illustrated in FIG. 3A, the magnet 116 positioned to the left of the opening 106 may overcome the magnetic attraction of the other magnet 116, illustrated by arrow 302, and pull or swivel the cover 108 the rest of the way, according to an example. Referring to FIG. 3C, once tab 120 makes contact with tab 118, the cover 108 may not swivel beyond the point illustrated.

As an example, when the user desires to maintain privacy (i.e., back to the first position illustrated in FIG. 3A), the user may then flick or push the cover 108 with a force that overcomes the magnetic attraction between the cover 108 and magnet 116 positioned to the left of the opening 106. When the cover 108 is pushed from either the first or second position, unless the cover 108 is pushed at least 90 degrees, the magnetic attraction provided by the magnet 116 positioned on the originating side may attract the cover 108 back to its original position.

Figure 4A:
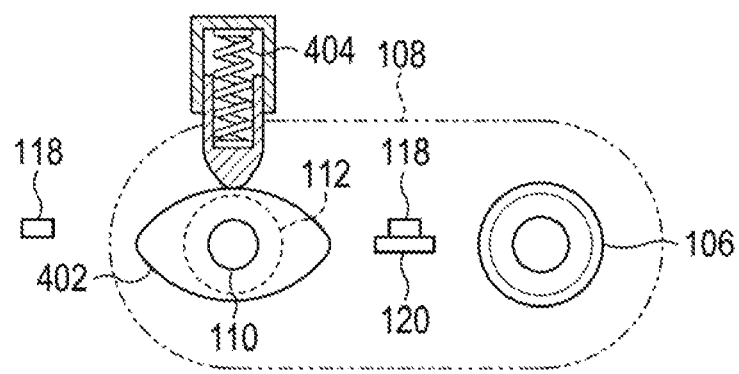
FIGS. 4A-C illustrate the use of a spring feature to assist the cover in swiveling between a first position and a second position, according to an example.
Figure 4B:
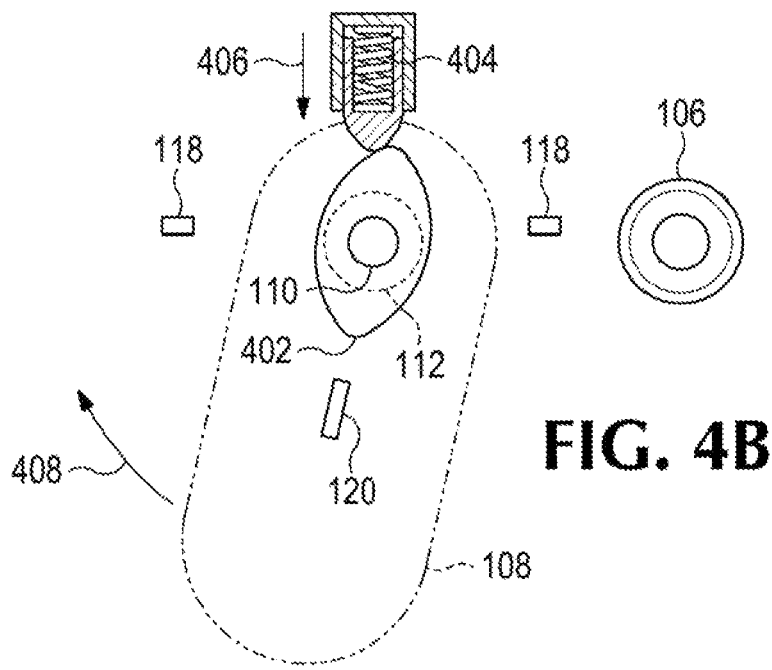
Figure 4C:
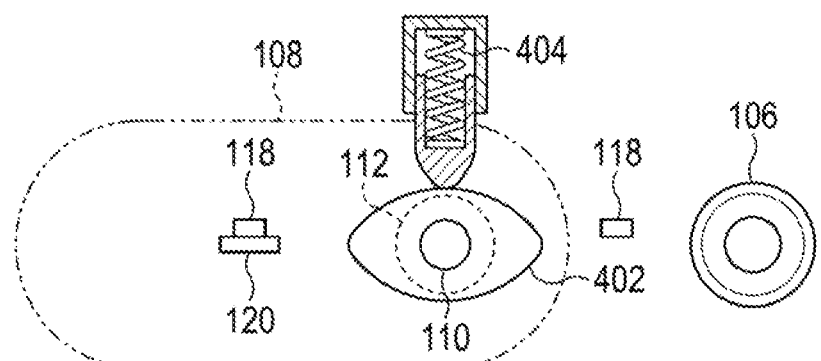

FIGS. 4A-C illustrate the use of a spring feature 404 to assist the cover 108 in swiveling between a first position that obscures a viewing portion of the opening 106 and a second position that exposes the viewing portion of the opening 106, according to an example. As mentioned above, in addition to the magnets 116, or in place of the magnets 116, the spring feature 404 may be used to assist the cover 108 in swiveling between the first and second positions. As illustrated, the cover comprises a cam 402 that is rotatable with the cover 108 around the pin 110. As will be further described, the spring feature 404 interacts with the cam 402 in order to assist the cover 108 in swiveling between the first and second positions.

Referring to FIG. 4A, the cover 108 is in the first position that obscures the viewing portion of the opening 106. As a result, the lens of the camera and/or microphone exposed through the opening 106 is covered, ensuring privacy. As an example, the spring feature 404, as illustrated in FIG. 4A is uncompressed and in a resting state. However, when the user desires to use the camera or microphone, the user may then flick or push the cover 108. When the second end of the cover 108 is pushed away from the first position, the interaction between the cam 402 and the spring feature 404 may cause the second end of the cover 108 to swivel to the second position illustrate in FIG. 4C. As an example of the interaction, the cam 402 compresses the spring feature 404, as the cover 108 is pushed around pin 110. The force created by the compression of the spring feature 404 may then be used to either swivel the cover 108 back to the first position illustrated in FIG. 4A, or swivel the cover 108 the rest of the way to the second position illustrated in FIG. 4C.

Referring to FIG. 4B, once the cover 108 is pushed at least 90 degrees past the first position illustrated in FIG. 4A, the force created by the compression of the spring feature 404 (illustrated by arrow 406) may be sufficient to swivel the cover 108 the rest of the way, illustrated by arrow 408, according to an example. Referring to FIG. 4C, once tab 120 makes contact with tab 118, the cover 108 may not swivel beyond the point illustrated. However, if the cover 108 is pushed less than 90 degrees, the force created by the compression of the spring feature 404 may swivel the cover 108 back to the first position illustrated in FIG. 4A. As an example, when the user desires to maintain privacy (i.e., back to the first position illustrated in FIG. 4A), the user may then flick or push the cover 108 at least 90 degrees.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A housing comprising:
a bezel comprising an opening extending through the bezel;
a cover comprising a pin disposed on a first end of the cover, wherein the pin is insertable into a hole along the bezel; and
features to swivel a second end of the cover opposite the first end in either a first or second position, wherein in the first position, the second end is to obscure a viewing portion of the opening, and in the second position, the second end is to expose the viewing portion wherein the features corn e a first magnet and a second magnet in an internal volume of the housing to interact with the second end of the cover:
wherein when the second end of the cover is to be pushed away from the first position, the second magnet is to cause the second end swivel to the second position; and
wherein a magnetic attraction of the second magnet toward the second of the cover is to overcome a magnetic attraction of the first magnet toward the second end.

2. The housing of claim 1, wherein the first magnet is positioned on a first side of the opening and the second magnet is positioned on a second side of the opening that is opposite the first side of the opening.

3. The housing of claim 1, wherein the cover comprises a cam that is rotatable with the cover around the pin.

4. The housing of claim 3, wherein the features comprise a spring feature that interacts with the cam, wherein when the second end of the cover is to be pushed away from the second position, the interaction between the cam and the spring feature is to cause the second end to swivel to the first position.

5. The housing of claim 4, wherein when the second end of the cover is to be pushed away from the second position:
the cam is to compress the spring feature, and
a force created by compression of the spring feature is to cause the second end to swivel to the first position.

6. The housing of claim 1, comprising:
tabs to prevent the second end of the cover from moving beyond the first position or the second position.

7. A computing device comprising:
a camera comprising a lens; and
a housing comprising:
an opening extending through the housing, wherein the opening is to accommodate the lens;
a cover comprising a pin disposed on a first end of the cover, wherein the pin is insertable into a hole of the housing; and
a first magnet and a second magnet in an internal volume of the housing to swivel a second end of the cover opposite the first end between a first position and a second position, wherein in the first position, the second end is to obscure a viewing portion of the lens, and in the second position, the second end is to expose the viewing portion,
wherein when the second end of the cover is to be pushed away from the first position, the second magnet is to cause the second and to swivel to the second position, and
wherein a magnetic attraction of the second magnet toward the second end of the cover is to overcome a magnetic attraction of the first magnet toward the second end.

8. The computing device of claim 7, wherein the first magnet is positioned on a first side of the opening and the second magnet is positioned on a second side of the opening that is opposite the first side of the opening.

9. The computing device of claim 7, wherein the cover comprises a cam that is rotatable with the cover around the pin.

10. The computing device of claim 9, wherein the housing comprises a spring feature that interacts with the cam, wherein when the second end of the cover is to be pushed away from the second position:
a magnetic attraction of the first magnet toward the second end of the cover is to overcome a magnetic attraction of the second magnet toward the second end, and
the interaction between the cam and the spring feature is to cause the second end to swivel to the first position.

* * * * *